UNITED STATES PATENT OFFICE.

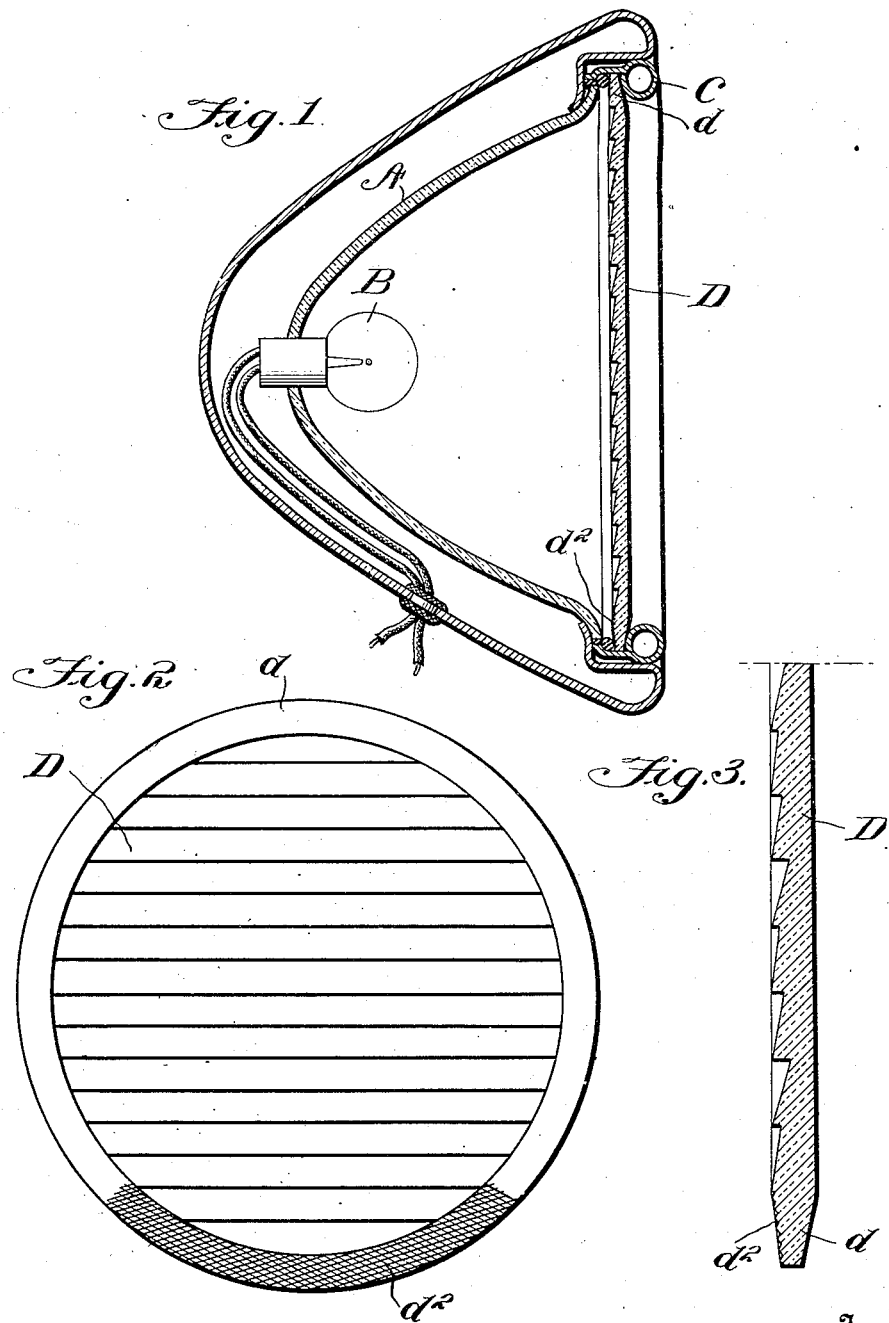

WILLIAM CHURCHILL, OF NEW YORK, N. Y., ASSIGNOR TO CORNING GLASS WORKS, OF CORNING, NEW YORK, A CORPORATION OF NEW YORK.

HEADLIGHT-COVER GLASS.

1,312,950.     Specification of Letters Patent.     Patented Aug. 12, 1919.

Original application filed November 22, 1915, Serial No. 62,756. Divided and this application filed July 2, 1919. Serial No. 308,072.

*To all whom it may concern:*

Be it known that I, WILLIAM CHURCHILL, a citizen of the United States of America, and a resident of the city of New York, borough of Manhattan, and State of New York, have invented certain new and useful Improvements in Headlight-Cover Glasses, of which the following is a specification.

This application which is filed as a division of my prior application, Serial No. 62,756, filed Nov. 22, 1915, relates to means whereby a transparent or translucent cover, having light-directing elements located in the central portion thereof, may be secured within the casing of the headlight in such a manner as to prevent the projection of rays crossing the axis of the headlight, and for this purpose it comprises a cover glass having the light-directing elements in its central portion, and having an annular chamfered edge for engagement with the casing, the chamfered edge having a roughened surface to prevent refraction by the edge, of light across the optical axis of the head-light.

Referring to the accompanying drawings, in which corresponding parts are designated by corresponding marks of reference,—

Figure 1 is a vertical section through an automobile head-light embodying this invention.

Fig. 2 is a front view of the cover therefor.

Fig. 3 is a vertical section through the cover showing the chamfered roughened edge.

The casing 1 may be of any approved construction, containing a mirror A— and a light source B. In front of these elements is located the transparent cover D— generally made of glass, and adapted to be held in place in some proper manner such as by the clamping ring C— adapted to engage the edge of the cover. On the central portion of the cover are located proper light-directing elements specifically shown in the form of horizontal prisms adapted to prevent a spread of the beam projected therethrough. As shown the edge of the glass is thinner than the central portion of the glass, the latter being increased in thickness by the light-directing elements thereon. In the construction shown, the edge is chamfered, as is shown at $d$ in Fig. 3. It thus forms an annular prism tending to refract light passing therethrough toward the axial center line of the cover, and toward the optical axis of the projecting system formed by the lamp and reflector. This is not particularly objectionable in rays passing through the top edge of the cover, but is objectionable in rays passing through the bottom edge of the cover, for such rays are then directed upwardly and across the optical axis, and may strike the eyes of the approaching driver. For the purpose of preventing this cross projection of light I roughen the chamfered edge by sand-blasting, or otherwise matting a surface thereof, whereby such light passing therethrough, instead of being reflected as a beam, will be spread and diffused. In the drawings, this matting is shown at $d^2$ as localized at the bottom edge, for the reason that refraction at such point is the most objectionable.

Having thus described my invention, what I claim and desire to secure by Letters Patent is:—

In a cover for an automobile head-light, the combination with a lamp and its casing, of a transparent cover for the casing having light-directing elements on its central portion, such light-directing elements being surrounded by a chamfered edge for engagement by the casing, the chamfered edge having a roughened surface to prevent refraction thereby of light across the optical axis of the head-light.

In testimony whereof I hereunto affix my signature this 30th day of June 1919.

WILLIAM CHURCHILL.